US008547666B2

(12) United States Patent
Katada et al.

(10) Patent No.: US 8,547,666 B2
(45) Date of Patent: Oct. 1, 2013

(54) CURRENT PERPENDICULAR TO PLANE MAGNETORESISTIVE HEAD HAVING SUPPRESSED SPIN TORQUE NOISE

(75) Inventors: Hiroyuki Katada, Kanagawa (JP); Hiroyuki Hoshiya, Kanagawa (JP)

(73) Assignee: HGST Netherlands BV, Amsterdam (NL)

( * ) Notice: Subject to any disclaimer, the term of this patent is extended or adjusted under 35 U.S.C. 154(b) by 962 days.

(21) Appl. No.: 11/890,004

(22) Filed: Aug. 3, 2007

(65) Prior Publication Data
US 2008/0055791 A1 Mar. 6, 2008

(30) Foreign Application Priority Data
Aug. 4, 2006 (JP) .................................. 2006-213596

(51) Int. Cl.
*G11B 5/39* (2006.01)
(52) U.S. Cl.
USPC ............... 360/324.12; 360/324.11; 360/324.2
(58) Field of Classification Search
USPC .................. 360/324.1, 324.11, 324.12, 324.2
See application file for complete search history.

(56) References Cited

U.S. PATENT DOCUMENTS

| | | | |
|---|---|---|---|
| 2004/0057162 A1* | 3/2004 | Gill | 360/314 |
| 2004/0141260 A1* | 7/2004 | Hasegawa et al. | 360/324.11 |
| 2006/0158792 A1* | 7/2006 | Gill | 360/324.11 |
| 2007/0019338 A1* | 1/2007 | Childress et al. | 360/324.1 |
| 2007/0063237 A1* | 3/2007 | Huai et al. | 257/295 |
| 2007/0279810 A1* | 12/2007 | Funayama et al. | 360/324.1 |

OTHER PUBLICATIONS

Covington et al., "Current-Induced Magnetization Dynamics in Current Perpendicular to the Plane Spin Valves," *Phys. Rev.* B 69: 1884406 (2004) (8 pages).
Smith et al., "Angular Dependence of Spin Torque Critical Currents for CPP-GMR Read Heads," *IEEE Transactions on Magnetics*, 41(10):2935-2940 (Oct. 2005).
Zhu et al., "Spin Transfer Induced Noise in CPP Read Heads," *IEEE Transactions on Magnetics*, 40(1):182-188 (Jan. 2004).

* cited by examiner

*Primary Examiner* — Craig A. Renner
(74) *Attorney, Agent, or Firm* — Daphne L. Burton; Burton IP Law Group

(57) ABSTRACT

Embodiments of the present invention aim suppress the generation of spin torque noise in a current perpendicular to plane magnetoresistive head. According to one embodiment, when sensing current is applied to a current perpendicular to plane magnetoresistive head from a free layer toward a first pinned layer, a configuration wherein the relative angle between the magnetization of a second pinned layer and the magnetization of the free layer is in the range of 70 to 80 degrees is used. Further, when sensing current is applied to a current perpendicular to plane magnetoresistive head from a first pinned layer toward a free layer, a configuration wherein the relative angle between the magnetization of a second pinned layer and the magnetization of the free layer is in the range of 100 to 110 degrees is used.

8 Claims, 8 Drawing Sheets

CURRENT PERPENDICULAR TO PLANE MAGNETORESISTIVE HEAD HAVING SUPPRESSED SPIN TORQUE NOISE

CROSS-REFERENCE TO RELATED APPLICATION

The instant nonprovisional patent application claims priority to Japanese Patent Application No. 2006-213596 filed Aug. 4, 2006 and which is incorporated by reference in its entirety herein for all purposes.

BACKGROUND OF THE INVENTION

A magnetoresistive head is used as a read sensor in a highly recording density magnetic recording technology mainly for a hard disk; and constitutes a part that largely affects the performance of a magnetic recording technology. In recent years, the magnetoresistance effect of a multilayer film formed by laminating ferromagnetic metal layers with a nonmagnetic metal layer in between has become substantial, and the resulting "giant magnetoresistance effect", is well known. In this case, electric resistance varies in accordance with the angle formed between the magnetizations of the two ferromagnetic layers interposing the nonmagnetic intermediate layer. When such a giant magnetoresistance effect is applied to a magnetoresistive element, a structure called a spin valve is advocated. A spin valve structure: takes the structure of an antiferromagnetic layer/a ferromagnetic layer/a nonmagnetic intermediate layer/a ferromagnetic layer; and makes it possible to substantially pin the magnetization of the ferromagnetic layer touching the antiferromagnetic layer through a magnetic exchange coupling field generated at the interface between the antiferromagnetic layer and the ferromagnetic layer, freely rotate the magnetization of the other ferromagnetic layer through an external field, and thereby obtain an output. Here, a ferromagnetic layer wherein the magnetization is substantially pinned by an antiferromagnetic layer is defined as a pinned layer and a ferromagnetic layer wherein the magnetization rotates through an external field is defined as a free layer. The aforementioned basic construction is also commonly adopted in a GMR that is currently used, specifically a CIP-GMR, a tunneling magnetoresistive element (a TMR), and a current perpendicular to plane GMR (a CPP-GMR).

Further, in a read sensor, a pair of magnetic shields is disposed in the manner of interposing the magnetoresistive element in order to select a magnetic field to be sensed from all the external fields. In a current perpendicular to plane magnetoresistive head such as a CPP-GMR or a TMR, a structure wherein electric current is applied to a sensor through the aforementioned paired magnetic shields is generally adopted.

In a current perpendicular to plane magnetoresistive head, it is known that gigantic noise called spin torque noise caused by spin conduction is generated in accordance with a relative angle between the magnetization of a free layer and the magnetization of a pinned layer and the direction of the flow of electric current as shown in M. Covington, M. AlHajDarwish, Y. Ding, N. J. Gokemeijer, and M. A. Seigler, Phys. Rev. B, vol. 69, pp. 184406-1-184406-8, 2004; J. G. Zhu and X. Zhu, IEEE Trans. Magn., vol. 40, pp. 182-188, 2004; and N. Smith, J. A. Katine, J. R. Childress, M. J. Carey, IEEE Trans. Magn., vol. 41, pp. 2935-2940, 2005.

BRIEF SUMMARY OF THE INVENTION

Embodiments in accordance with the present invention suppress the generation of spin torque noise in a current perpendicular to plane magnetoresistive head. According to one embodiment of the present invention, when sensing current is applied to a current perpendicular to plane magnetoresistive head from a free layer toward a first pinned layer, a configuration wherein the relative angle between the magnetization of a second pinned layer and the magnetization of the free layer is in the range of 70 to 80 degrees is used. Further, when sensing current is applied to a current perpendicular to plane magnetoresistive head from a first pinned layer toward a free layer, a configuration wherein the relative angle between the magnetization of a second pinned layer and the magnetization of the free layer is in the range of 100 to 110 degrees is used.

DETAILED DESCRIPTION OF THE INVENTION

Figure 1:
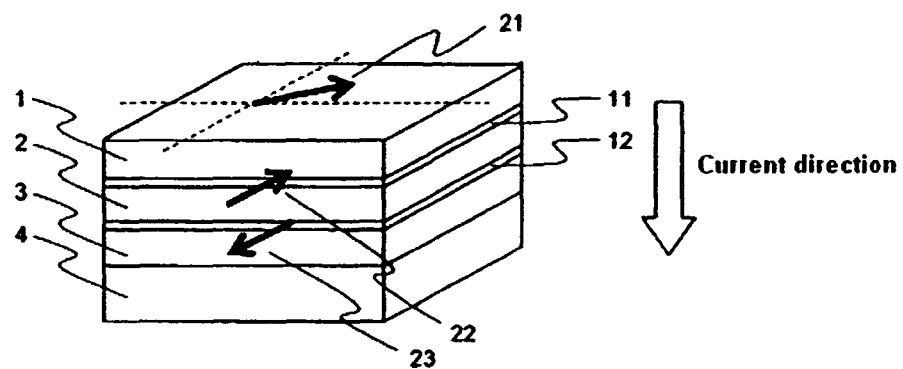
FIG. 1 is a schematic view showing a configuration example of a CPP magnetoresistive head according to an embodiment of the present invention.

Embodiments according to the present invention relate to a magnetic head and a magnetic storage apparatus and in particular to a current perpendicular to plane magnetoresistive head suitably used for a highly recording density magnetic storage apparatus.

A problem to be solved by embodiments of the present invention is to provide a current perpendicular to plane magnetoresistive head that does not cause spin torque noise.

According to embodiments of the present invention, in a current perpendicular to plane magnetoresistive head wherein sensing current flows from a free layer toward a pinned layer, the relative angle of magnetization between the pinned layer and the free layer is controlled in the range of 70 to 80 degrees in the state where a magnetic field to be sensed is not applied. On the other hand, in the case of a current perpendicular to plane magnetoresistive head wherein sensing current flows from a pinned layer toward a free layer, the relative angle of magnetization between the pinned layer and the free layer is controlled in the range of 100 to 110 degrees in the state where a magnetic field to be sensed is not applied. The present inventors have found that an SN ratio deteriorates because of the generation of spin torque noise when a combination of such sensing current and a relative angle of the magnetization between the pinned layer and the free layer is other than the aforementioned combination.

Further, when a magnetic storage apparatus is configured according to embodiments of the present invention, as a technology for the selection and assembly of a magnetic head, the asymmetry of signal waveforms in a current perpendicular to plane magnetoresistive head mounted on the system is measured and sensing current is set: so as to flow from the free layer toward the pinned layer when the asymmetry of a signal waveform is in the range of +10% to −20%; and so as to flow from the pinned layer toward the free layer when the asymmetry of the signal waveform is in the range of +20% to +10%. Otherwise, the sensing current is set: so as to flow from the pinned layer toward the free layer when the asymmetry of a measured signal waveform is in the range of +20% to −10%; and so as to flow from the free layer toward the pinned layer when the asymmetry of the measured signal waveform is in the range of −10% to −20%.

Embodiments of the present invention make it possible to: suppress the generation of spin torque noise; increase the SNR of a head; and improve the production yield of the head.

Embodiments of the present invention use a spin valve type magnetoresistive element having a laminated structure of an antiferromagnetic layer/a first pinned layer/an antiparallel coupling layer/a second pinned layer/a nonmagnetic intermediate layer/a free layer as a current perpendicular to plane magnetoresistive head (a CPP magnetoresistive head). Further, in order to apply sensing current perpendicularly to a magnetoresistive film, a pair of conductive electrodes are disposed; one is on the side of the free layer and the other is on the side of the first pinned layer.

Here, the antiferromagnetic film is a film that applies a magnetic exchange coupling bias in order to substantially pin the magnetization of the ferromagnetic pinned layer. The film may be formed tightly on the ferromagnetic pinned layer in a direct manner or the effect thereof may be yielded through indirect magnetic coupling. Otherwise, in place of an antiferromagnetic film, another bias applying means, such as the remanent magnetization of a hard magnetic film or an electric current bias, may be used. The first and second pinned layers are coupled to each other interposing the antiparallel coupling layer so that the magnetizations thereof may be antiparallel with each other and the coupling magnetic field is sufficiently larger than a magnetic field to be sensed. The magnitude of an actual antiparallel coupling magnetic field is about several hundred to several thousand oersteds. As a result, the magnetization of the second pinned layer is pinned to the magnetic field to be sensed. The free layer changes the direction of the magnetization in response to the magnetic field to be sensed. An output is generated by the relative angle between the magnetization of the free layer that changes the direction in response to the magnetic field to be sensed and the magnetization of the second pinned layer that is pinned to the magnetic field to be sensed.

The thin film that comprises a giant magnetoresistive laminated film according to embodiments of the present invention was produced with a DC magnetron sputtering apparatus in the following manner. The following materials were sequentially laminated on a ceramic substrate in an atmosphere containing argon by 1 to 6 millitorrs (0.1 to 0.8 pascals). As sputtering targets, targets made of tantalum, nickel-20 at % ferroalloy, copper, Co-Fe, MnPt, ruthenium, alumina, MnIr, and MnIrCr were used. The layers of the laminated film were sequentially formed by: generating plasma in the apparatus beforehand by applying high-frequency power to a cathode disposed on each target; and opening and closing a shutter disposed on each cathode one by one. When the film was formed, a magnetic field of about 80 oersteds (6.4 kA/m) was applied in parallel with the substrate with a permanent magnet and thereby uniaxial anisotropy was granted. The formed film was subjected to heat treatment for three hours at 270° C. in a vacuum and in a magnetic field, thereby the MnPt, MnIr, or MnIrCr antiferromagnetic film was magnetized to form the magnetic exchange coupling field, and the magnetoresistance was measured at room temperature and evaluated. The elements on the substrate were formed by patterning in a photoresist process. Thereafter the substrate was subjected to slider processing and mounted on a magnetic storage apparatus.

EXAMPLE 1

FIG. 1 is a schematic view showing a first configuration example of a magnetoresistive film in a current perpendicular to plane magnetoresistive head according to one embodiment of the present invention. The magnetoresistive film has the following configuration. That is, the magnetoresistive film is produced by consecutively forming an antiferromagnetic film 4, a first pinned layer 3, an antiparallel coupling layer 12, a second pinned layer 2, a nonmagnetic intermediate layer 11, and a free layer 1.

The free layer 1 comprises a laminated film of a CoFe alloy and a NiFe alloy but a single layered film of a CoFeB alloy, a CoMnGe Heusler alloy, a CoMnSi Heusler alloy, a CoCrAl Heusler alloy, or a CoFeAl alloy, or a laminated film formed by combining those alloys may also be used.

Cu is used for the nonmagnetic intermediate layer 11 in order to generate giant magnetoresistance effect but Au, Ag, or an alloy of them may be used. Further, in order to generate tunneling magnetoresistance effect, alumina, titanium oxide, or MgO may be used.

A CoFe alloy is used for the second pinned layer 2 and the first pinned layer 3 but a single layered film of a NiFe alloy, a CoFeB alloy, a CoMnGe Heusler alloy, a CoMnSi Heusler alloy, a CoCrAl Heusler alloy, or a CoFeAl alloy, or a laminated film formed by combining those alloys may also be used. A same material may be used for both the second pinned layer 2 and the first pinned layer 3 or different materials may be used for the second pinned layer 2 and the first pinned layer 3 respectively.

A material, such as Ru, Ir, Cr, Rh, Re, Os, or Pt, the thickness of which is properly selected may be used for the antiparallel coupling layer 12 in order to antiferromagnetically couple the second pinned layer magnetization 22 to the first pinned layer magnetization 23. The magnitude of the antiferromagnetic coupling is preferably not less than one kilooersted, namely 80 kA/m, and a strong antiferromagnetic coupling is desirable.

The antiparallel coupling layer 12 has the effect of: applying magnetic exchange coupling to arrange the magnetization 23 of the first pinned layer and the magnetization 22 of the second pinned layer in antiparallel with each other; and pinning the magnetization 22 of the second pinned layer to a magnetic field to be sensed. Here, even when the first pinned layer 3 is made of either a single layered magnetic material or a multilayer comprising double layers or not less than four layers, the first pinned layer 3 does not deviate from the tenor of the present invention. Further, even when the free layer 1 is made of either a single layered magnetic material or a multilayer comprising two or more layers though it is not shown in the figure, the multilayer is regarded as a magnetically integrated structure and hence the free layer 1 does not deviate from the tenor of the present invention.

In the magnetoresistive film shown in FIG. 1, sensing current flows from the free layer 1 toward the first pinned layer 3. In the state where a signal magnetic field to be sensed is not applied, the relative angle between the magnetization 21 of the free layer and the magnetization 22 of the second pinned layer is in the range of 70 to 80 degrees. This corresponds to the range of +5% to +10% in terms of signal waveform asymmetry.

Here, asymmetry of a signal waveform is an index represented by the expression;

$$((V1-V2)/(V1+V2))\times 100$$

when, in a signal magnetic field to be sensed, a reproduced output generated by a signal magnetic field in the direction in which an N pole is applied to a current perpendicular to plane magnetoresistive head is defined as V1 and a reproduced output generated by a signal magnetic field in the direction in which an S pole is applied to the magnetic head is defined as V2. The asymmetry of a signal waveform can be regarded as an index to show a relative angle θ formed between the free layer magnetization 21 and the second pinned layer magnetization 22 in a magnetoresistive head. That is, the relative angle θ is about 90 degrees when the asymmetry of a signal waveform is zero, about zero degree when the asymmetry of a signal waveform is +100%, and about 180 degrees when the asymmetry of a signal waveform is −100%.

Figure 2:
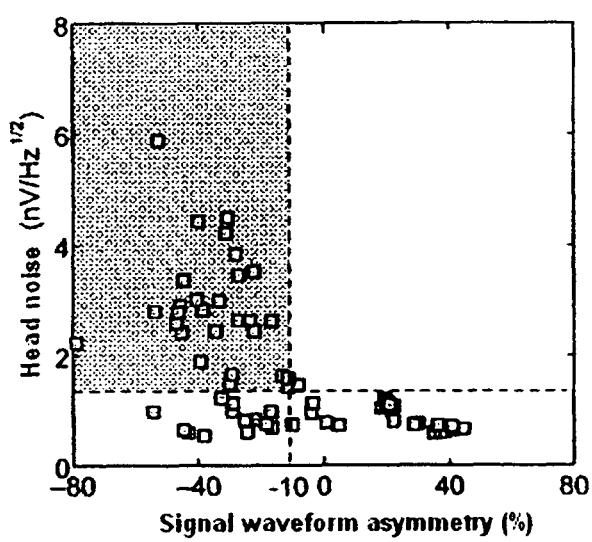
FIG. 2 is a graph showing the relationship between the noise and the signal waveform asymmetry of a CPP magnetoresistive head.

FIG. 2 shows an example of the relationship between noise and the asymmetry of a signal waveform when sensing current is applied from the free layer 1 to the second pinned layer 2. As shown in the figure, it is understood that, when signal waveform asymmetry is −10% or more (the relative angle between the free layer magnetization 21 and the second pinned layer magnetization 22 is 110 degrees or more), giant noise is generated. It is known that, in the case of a magnetoresistive head to which a spin valve is adapted, giant noise called spin torque noise is generated in accordance with the relative angle between the magnetization 21 of the free layer and the magnetization 22 of the second pinned layer and the flow direction of electric current.

When waveform asymmetry is large on a negative side, the free layer magnetization 21 and the second pinned layer magnetization 22 are nearly in antiparallel with each other. When sensing current is applied from the free layer 1 to the second pinned layer 2, electrons flow from the second pinned layer 2 to the free layer 1. Since the electrons are polarized at the second pinned layer 2, the direction of the spin of the electrons flowing in the free layer 1 is identical to the direction of the second pinned layer magnetization 22, that is, antiparallel with the free layer magnetization 21. As a result, the free layer magnetization 21 is not stabilized, the waveform asymmetry is negative, and giant noise is generated in the configuration wherein electric current flows from the free layer 1 to the second pinned layer 2.

Figure 3:
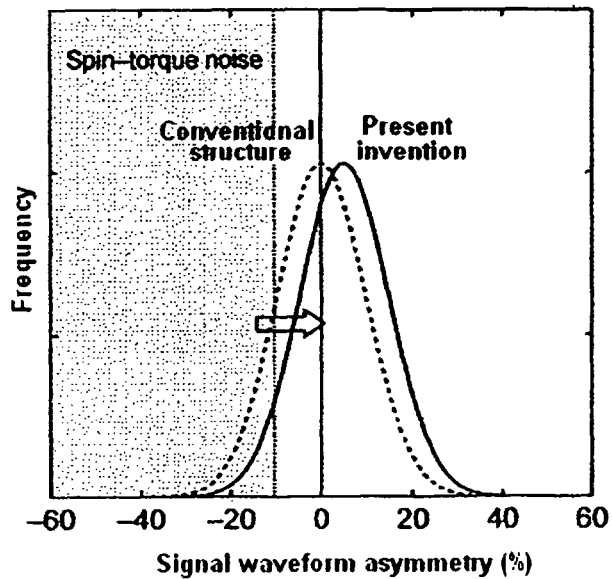
FIG. 3 is a schematic graph showing the distribution of waveform asymmetry of a conventional CPP magnetic head and a CPP magnetic head according to an embodiment of the present invention.

FIG. 3 schematically shows: the distribution of the signal waveform asymmetry of a magnetic head of a conventional configuration; and the statistical distribution of signal waveforms when a configuration according to embodiments of the present invention wherein the relative angle between the magnetization of the free layer and the magnetization of the second pinned layer, those layers being shown in FIG. 1, is in the range of 70 to 80 degrees (the asymmetry of the signal waveform is in the range of +5% to +10%) is used.

A magnetic head of a conventional configuration is designed so that the signal waveform may be symmetrical (asymmetry zero %), that is, the relative angle between the free layer magnetization 21 and the second pinned layer magnetization 22 may be 90 degrees. As a consequence, the signal waveform asymmetry of produced magnetic heads distributes around the zero % asymmetry as shown with the broken line in FIG. 3.

As a result, the magnetic heads having waveform asymmetry of 10% or more account for 15% of the total magnetic heads. Large spin torque noise is generated with the 15% magnetic heads and hence a satisfactory signal/noise ratio cannot be obtained. Resultantly, an arising problem here is that the production yield of magnetic heads deteriorates.

On the other hand, by using the configuration according to embodiments of the present invention shown in FIG. 1, the center value of the statistical distribution of signal waveforms shifts to +5% to +10% as shown with the solid line in FIG. 3. When the center value is +5% as indicated in the present invention, the heads having signal waveform asymmetry of −10% or lower account for 6% of all the heads. That is, spin torque noise occurs in 6% of the total heads. As shown above, the spin torque noise incidence in the case of a conventional configuration is 15%. Therefore, the noise incidence of a configuration according to embodiments of the present invention is lower than that of the conventional configuration by 9%. Further, the noise incidence when the center of the distribution is set at +10% is 2%.

By using a magnetoresistive film of the configuration shown in FIG. 1 as explained above, it is possible to: reduce the occurrence of spin torque noise; statistically improve the SNR of a head; and resultantly improve the production yield of heads.

Meanwhile, when the relative angle between the magnetization of the free layer and the magnetization of the second pinned layer is set at an angle smaller than 70 to 80 degrees, inversely asymmetry increases and thereby the yield lowers. In consequence, an appropriate relative angle between the magnetization of the free layer and the magnetization of the second pinned layer is in the range of 70 to 80 degrees when electric current is directed to the first pinned layer 3 from the free layer 1.

Figure 4:
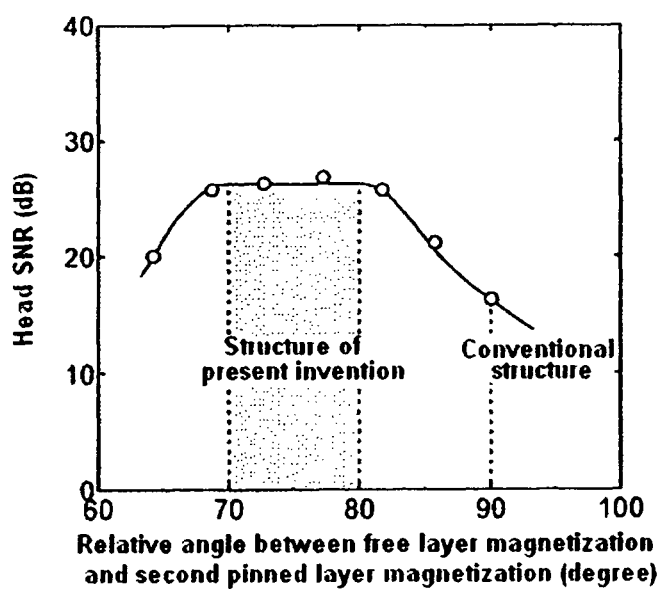
FIG. 4 is a graph showing the characteristic example of a conventional technology and an embodiment of the present invention.

FIG. 4 shows the SN ratios of heads when the relative angle between the magnetization of the free layer and the magnetization of the second pinned layer is actually varied. It is understood that the head SN ratio takes the highest value when the relative angle of magnetization is in the range of 70 to 80 degrees.

A concrete configuration example wherein the signal waveform asymmetry of a current perpendicular to plane magnetoresistive head according to embodiments of the present invention is set in an appropriate range (or the center value is set at an appropriate value) is hereunder explained.

In order to realize a configuration wherein the relative angle between the free layer magnetization 21 and the second pinned layer magnetization 22 is in the range of 70 to 80 degrees (the signal waveform asymmetry is +5% to +10%), it is necessary to satisfy the expression M1>M2, when the product of the saturation magnetization and the film thickness of the first pinned layer 3 is defined as the magnetic moment M1 and the product of the saturation magnetization and the film thickness of the second pinned layer 2 is defined as the magnetic moment M2.

Figure 5:
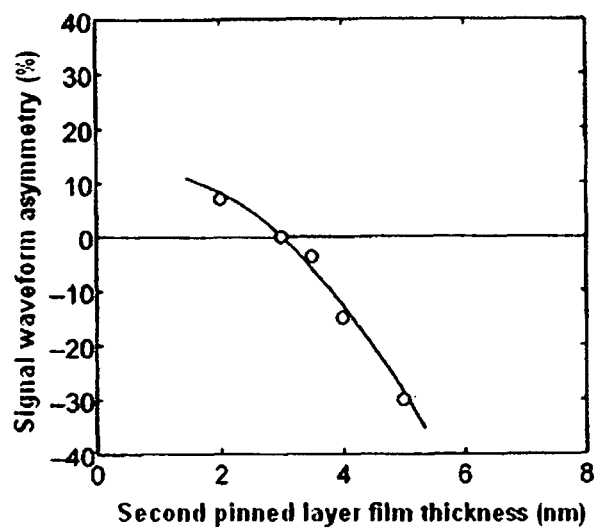
FIG. 5 is a graph showing the signal waveform asymmetry when the film thickness of the second pinned layer is varied.

As an example, signal waveform asymmetry when the film thickness of the second pinned layer 2 is varied is shown in FIG. 5. Here, the case where the film thickness of the magnetized first pinned layer 3 is kept constant at 3 nm and the saturation magnetizations of the second pinned layer 2 and the magnetized first pinned layer 3 are identical is shown. By setting the film thickness of the second pinned layer 2 at 1.5 to 2.5 nm for example, it is possible to control the waveform asymmetry in the range of +5% to +10% (to control the relative angle between the magnetization of the soft magnetic free layer 1 and the magnetization of the second pinned layer 2 in the range of 70 to 80 degrees). This is because, by setting the difference of the magnetic moment between the first pinned layer 3 and the second pinned layer 2, namely M1−M2, at 1 to 3 nm·T (nanometer tesla), the magnetic field generated from the edges of the first pinned layer 3 exceeds the magnetic field generated from the edges of the second pinned layer 2 and the effect of shifting the free layer magnetization 21 from 90 degrees to an appropriate extent is exhibited.

Figure 6:
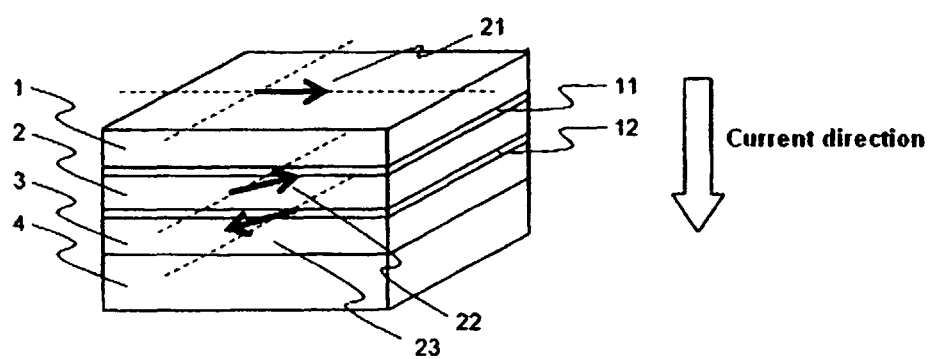
FIG. 6 is a schematic view showing a configuration example of a CPP magnetoresistive head according to an embodiment of the present invention.

The relative angle of 70 to 80 degrees between the free layer magnetization 21 and the second pinned layer magnetization 22 (that is, the signal waveform asymmetry of +5% to +10%) can also be realized by leaning the magnetizations of the second pinned layer and the first pinned layer by 10 to 20 degrees from the direction of sensor height. The magnetization array on this occasion is shown in FIG. 6. The magnetization directions of the first pinned layer and the second pinned layer can be controlled by applying heat treatment in a magnetic field. In a conventional configuration, heat treatment is applied while a magnetic field is applied in the direction of sensor height so that the magnetizations of the second pinned layer 2 and the first pinned layer 3 may be parallel (or antiparallel) with the direction of the sensor height. In order to realize a configuration according to embodiments of the present invention, the direction of the magnetic field applied at the heat treatment is deviated by a desired angle from the direction of the sensor height. Thereby it is possible to deviate the direction of the second pinned layer magnetization 22. As a result, the relative angle of the magnetization between the free layer 1 and the second pinned layer 2 can be controlled. That is, when sensing current is applied from the free layer 1 to the second pinned layer 2, it is necessary to apply heat treatment while the magnetizations of the second pinned layer and the first pinned layer are leaned by 10 to 20 degrees from the direction of the sensor height and a magnetic field is applied in the direction forming an angle of 70 to 80 degrees to the magnetization of the free layer 1.

EXAMPLE 2

Figure 7:
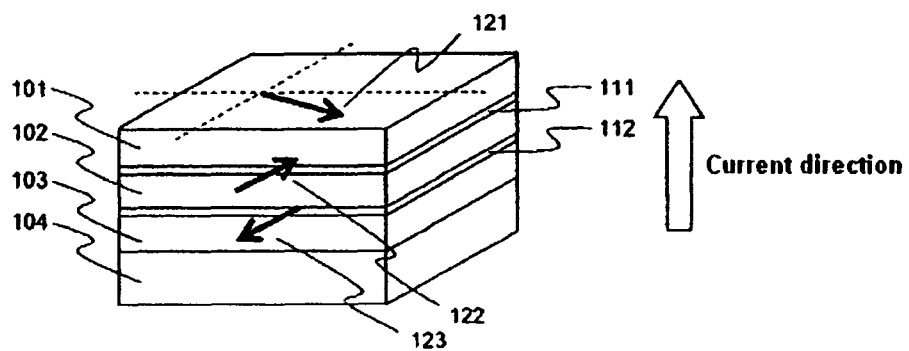
FIG. 7 is a schematic view showing another configuration example of a CPP magnetoresistive head according to an embodiment of the present invention.

FIG. 7 is a schematic view showing the second configuration example of a magnetoresistive film in a current perpendicular to plane magnetoresistive head according to embodiments of the present invention.

In the configuration of the magnetoresistive film, an antiferromagnetic film 104, a first pinned layer 103, an antiparallel coupling layer 112, a second pinned layer 102, a nonmagnetic intermediate layer 111, and a free layer 101 are the same as the configuration of Example 1.

In the second configuration example shown in FIG. 7, however, sensing current is applied from the first pinned layer 103 toward the free layer 101. Further, the relative angle between the magnetization 121 of the free layer and the magnetization 122 of the second pinned layer is in the range of 100 to 110 degrees in the state where the signal magnetic field to be sensed is not applied. This corresponds to the range of −5% to −10% in terms of signal waveform asymmetry.

The reason why spin torque noise can be suppressed in the same way as Example 1 even in Example 2 where the configuration is different from Example 1 is as follows. When sensing current is applied from the second pinned layer 2 to the free layer 1 and the signal waveform asymmetry is +10% or more (the relative angle between the free layer magnetization 21 and the second pinned layer magnetization 22 is 70 degrees or less), giant spin torque noise occurs. When the waveform asymmetry is large on the positive side, this means that the free layer magnetization 21 and the second pinned layer magnetization 22 are parallel with each other. When sensing current is applied from the second pinned layer 2 to the free layer 1, electrons flow from the free layer 1 to the second pinned layer 2. On this occasion, the electrons having spins antiparallel with the spins of the second pinned layer 2 are reflected by the second pinned layer magnetization 22 and flow into the free layer 1. The direction of the spins of the reflected electrons flowing into the free layer 1 is antiparallel with the free layer magnetization 21. As a result, the free layer magnetization 21 is not stabilized, the waveform asymmetry is positive, and giant spin torque noise occurs in the case of the configuration wherein electric current flows from the second pinned layer 2 to the free layer 1.

Figure 8:
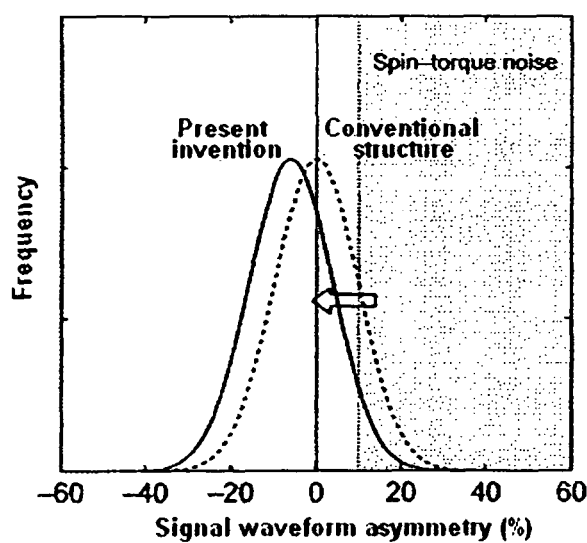
FIG. 8 is a schematic graph showing the distribution of waveform asymmetry of a conventional CPP magnetic head and a CPP magnetic head according to an embodiment of the present invention.

FIG. 8 shows a statistical distribution of signal waveforms when a structure wherein signal waveform asymmetry is in the range of −5% to −10% (the relative angle between the magnetization of the free layer and the magnetization of the second pinned layer is in the range of 100 to 110 degrees) is used in the configuration according to embodiments of the present invention shown in FIG. 7. In the structure, as shown in FIG. 8, the center value of the statistical distribution of signal waveforms shifts to −5% to −10%. When the center value is −5%, the heads having signal waveform asymmetry of +10% or more account for 6% of all the heads. That is, spin torque noise occurs in 6% of the total heads. As shown in the above problem, the spin torque noise incidence in the case of a conventional configuration is 15%. Therefore, the noise incidence of a configuration according to embodiments of the present invention is lower than that of the conventional configuration by 9%. Further, the noise incidence is 2% when the center of the distribution is set at −10%.

By using a head of the configuration shown in FIG. 7 as explained above too, it is possible to: reduce the occurrence of spin torque noise; statistically improve an SNR; and resultantly improve the production yield of heads.

A concrete configuration example wherein the asymmetry of a current perpendicular to plane magnetoresistive head according to embodiments of the present invention is set in an appropriate range (or the center value is set at an appropriate value) is hereunder explained. In order to realize a configuration wherein the relative angle between the free layer magnetization 121 and the second pinned layer magnetization 122 is in the range of 100 to 110 degrees (the signal waveform asymmetry is −5% to −10%), it is necessary to satisfy the expression M1<M2, when the product of the saturation magnetization and the film thickness of the first pinned layer 3 is defined as the magnetic moment M1 and the product of the saturation magnetization and the film thickness of the second pinned layer 2 is defined as the magnetic moment M2. As shown in FIG. 5, by setting the film thickness of the second pinned layer 2 at 3.5 to 4.0 nm for example, it is possible to control the waveform asymmetry in the range of −5% to −10% (to control the relative angle between the magnetization of the soft magnetic free layer 1 and the magnetization of the second pinned layer 2 in the range of 100 to 10 degrees).

Figure 9:
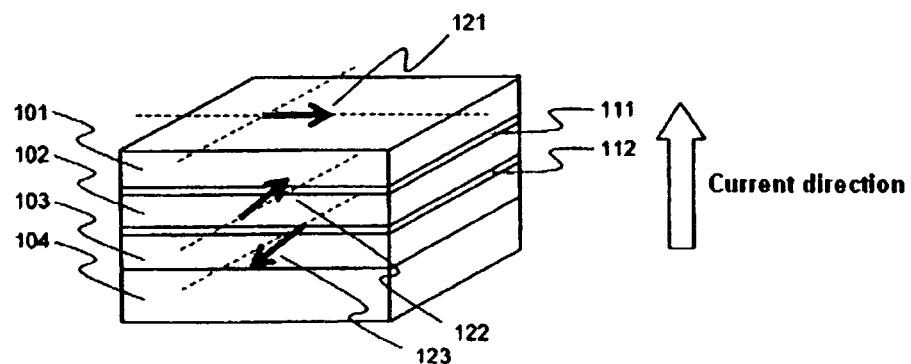
FIG. 9 is a schematic view showing another configuration example of a CPP magnetoresistive head according to an embodiment of the present invention.

The relative angle of 100 to 110 degrees between the free layer magnetization 121 and the second pinned layer magnetization 122 (that is, the signal waveform asymmetry of −5% to −10%) can also be realized by leaning the the second pinned layer magnetization 122 and the first pinned layer magnetization 123 by 10 to 20 degrees from the direction of sensor height. The magnetization array on this occasion is shown in FIG. 9. The magnetization directions of the first pinned layer and the second pinned layer can be controlled by applying heat treatment in a magnetic field. In a conventional configuration, heat treatment is applied while a magnetic field is applied in the direction of sensor height so that the the second pinned layer magnetization 122 and the first pinned layer magnetization 123 may be parallel (or antiparallel) with the direction of the sensor height. In order to realize a configuration according to embodiments of the present invention, the direction of the magnetic field applied at the heat treatment is deviated by a desired angle from the direction of the sensor height. Thereby it is possible to deviate the direction of the second pinned layer magnetization. 122. As a result, the relative angle of the magnetization between the free layer 1 and the second pinned layer 2 can be controlled. That is, when sensing current is applied from the free layer 1 to the second pinned layer 2, it is necessary to apply heat treatment while the second pinned layer magnetization 122 and the first pinned layer magnetization 123 are leaned by 10 to 20 degrees from the direction of the sensor height and a magnetic field is applied in the direction forming an angle of 100 to 110 degrees to the magnetization of the free layer 1.

EXAMPLE 3

An example of the configuration of a magnetic storage apparatus that improves the production yield of heads is shown hereunder.

Figure 10:
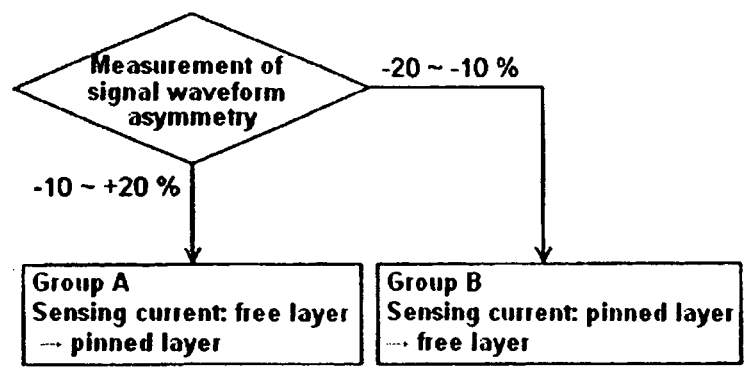
FIG. 10 is a flowchart showing a configuration method of a magnetic storage apparatus according to an embodiment of the present invention.

A flowchart for realizing a configuration according to embodiments of the present invention is shown in FIG. 10. In the configuration of a magnetic storage apparatus according to embodiments of the present invention, the asymmetry of a signal waveform at each of current perpendicular to plane magnetoresistive heads is measured and the heads are classified into 2 groups in accordance with the magnitude of the signal waveform asymmetry. In the present configuration, the heads are classified into the group A when the asymmetry is −10% to +20% and the group B when the asymmetry is −20% to −10%.

Figure 11:
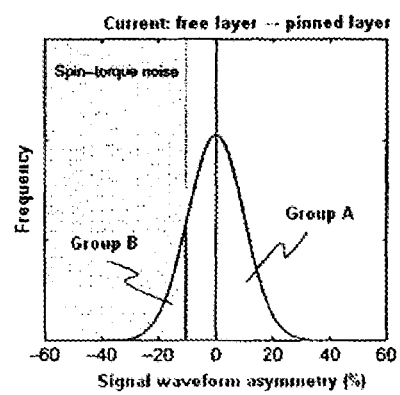
FIG. 11 is a schematic graph showing the distribution of waveform asymmetry of a CPP magnetic head and the grouping method of selection and configuration according to an embodiment of the present invention.

The reason why the yield of heads improves with the configuration according to embodiments of the present invention is as follows. FIG. 11 is a graph schematically showing the distribution of waveform asymmetry. The group A and the group B classified in accordance with the magnitude of the signal waveform asymmetry of heads are shown in the figure. The case where the center of the statistical distribution of waveform asymmetry is 0% is shown in FIG. 11, but the center of the statistical distribution of waveform asymmetry may not necessarily be 0%.

Figure 12:
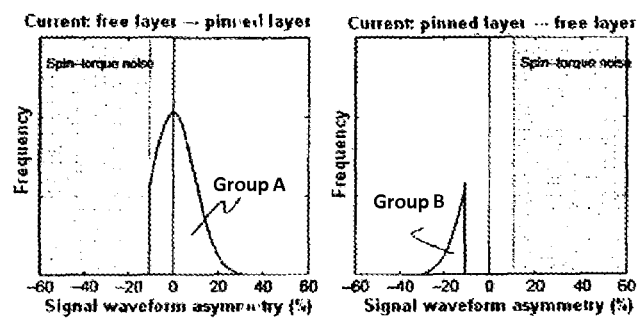
FIG. 12 comprises schematic graphs showing the distribution of waveform asymmetry of a CPP magnetic head and the grouping method of selection and configuration according to an embodiment of the present invention.

When sensing current is applied from the free layer to the first pinned layer, spin torque noise does not occur in the case of the group A but occurs in the case of the group B. Consequently, the magnetic storage apparatus is configured so that sensing current may be applied from the free layer to the first pinned layer in the case of the group A and sensing current may be applied from the first pinned layer to the free layer in the case of the group B. On this occasion, it is necessary to control the direction of the sensing current to a desired direction with an IC or wiring to switch electric current. As a result, as shown in FIG. 12, spin torque noise does not occur in both the cases of the groups A and B and thus it is possible to improve the production yield of heads.

When a magnetic storage apparatus according to embodiments of the present invention was configured, 96 heads out of 100 current perpendicular to plane magnetoresistive heads were acceptable. In contrast, when a magnetic storage apparatus was configured by a conventional method, 83 heads out of 100 heads were accepted. In this way, the configuration of a magnetic storage apparatus according to embodiments of the present invention makes it possible to improve the yield of heads.

EXAMPLE 4

Figure 13:
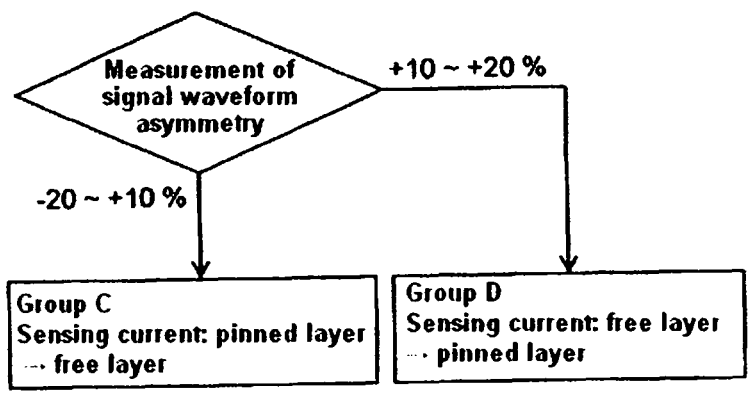
FIG. 13 is a flowchart showing a configuration method of a magnetic storage apparatus according to an embodiment of the present invention.

FIG. 13 is a flowchart for realizing the second configuration of a magnetic storage apparatus that improves the production yield of heads. In the configuration of the magnetic storage apparatus, in the same way as Example 3, the asymmetry of a signal waveform at each of current perpendicular to plane magnetoresistive heads is measured and the heads are classified into 2 groups in accordance with the magnitude of the signal waveform asymmetry. In the present configuration, the heads are classified into the group C of the heads the asymmetry of which is +10% to −20% and the group D of the heads the asymmetry of which is +20% to +10%.

When sensing current is applied from the first pinned layer to the free layer, spin torque noise does not occur in the case of the group C but occurs in the case of the group D. Consequently, the magnetic storage apparatus is configured so that sensing current may be applied from the first pinned layer to the free layer in the case of the group C and sensing current may be applied from the free layer to the first pinned layer in the case of the group D. As a result, spin torque noise does not occur in both the cases of the groups C and D and thus it is possible to improve the production yield of heads.

EXAMPLE 5

Figure 14:
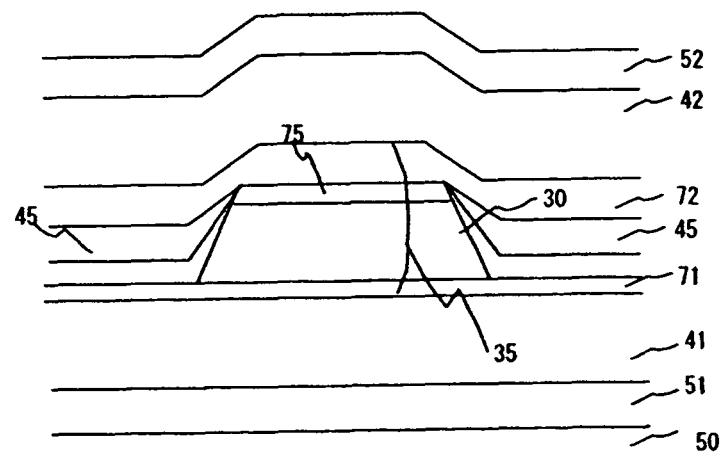
FIG. 14 is a view showing a configuration example of a magnetoresistive head according to an embodiment of the present invention.

FIG. 14 is a conceptual view, viewed from the side facing a magnetic medium, of a current perpendicular to plane magnetoresistive head on which a magnetoresistive film according to embodiments of the present invention is mounted. A second conductive electrode 51 is formed on a substrate 50 also taking the role of a slider, a lower magnetic shield 41 is formed thereon, thereon an under layer 71, a magnetoresistive film 30, and a protective film 75 are formed in sequence, and further a read gap 35 is formed by forming an upper shield under layer 72 and an upper shield 42. A first conductive electrode 52 is formed on the upper shield 42. A pair of hard bias layers 45 is formed by using a hard magnetic material on both the sides of the magnetoresistive film 30 in order to stabilize the operation of the magnetoresistive film 30.

The under layer 71 contributes to the improvement of crystallizability, a magnetoresistive ratio, and a soft magnetic property, but the omission of the under layer 71 does not deviate from the tenor of the present invention. The protective film 75 contributes to the improvement of corrosion resistance and the like, but the omission thereof does not deviate from the tenor of the present invention. The upper shield under layer 72 contributes to the improvement of the soft magnetic property of the upper shield 42, but the omission thereof does not deviate from the tenor of the present invention. In the figure, the structure having both the second conductive electrode and the lower magnetic shield is shown. However, even a structure wherein the second conductive electrode 51 is also used as the lower magnetic shield 41 does not deviate from the tenor of the present invention. Likewise, the first conductive electrode 52 can also be used as the upper magnetic shield 42.

Figure 15:
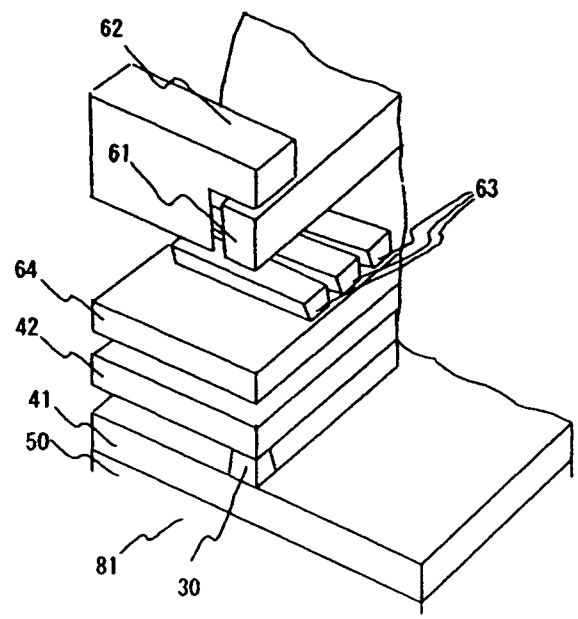
FIG. 15 is a view showing a configuration example of a perpendicular recording write-read separation type magnetic head.

FIG. 15 is a conceptual view showing the case where a magnetic head on which a magnetoresistive film according to the present invention is mounted is used in a perpendicular magnetic storage apparatus. On a substrate 50 that is also used as a slider, a lower magnetic shield 41, a magnetoresistive laminated film 30, an upper magnetic shield 42, a return pole 64, coils 63, a main pole 61, and a wraparound shield 62 as a magnetic shield surrounding the main pole are formed and further an opposite plane 81 is formed. Although the structure having an upper magnetic shield and a return pole is shown in the figure, even a structure having an upper magnetic shield used also as a return pole does not impair the tenor of the present invention. Further, even a structure not having a wraparound shield 62 does not impair the tenor of the present invention.

Figure 16:
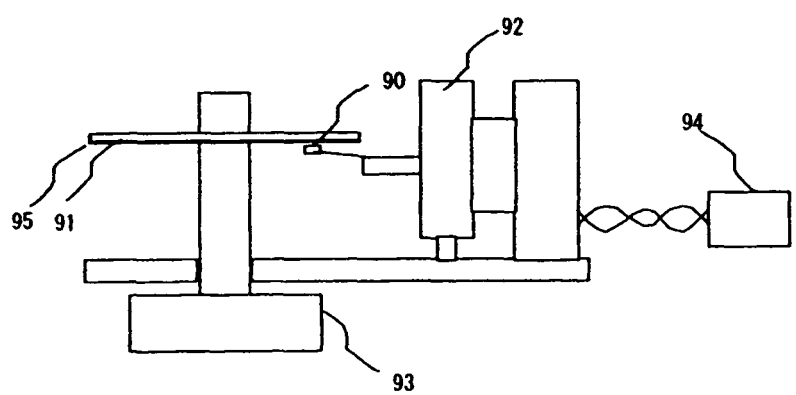
FIG. 16 is a view showing a configuration example of a magnetic storage apparatus.

FIG. 16 is a configuration example of a magnetic storage apparatus using perpendicular magnetic recording. A disk 91 retaining a recording medium 95 to magnetically record information is rotated with a spindle motor 93 and a head slider 90 is guided onto the track of the disk 91 with an actuator 92. That is, in the magnetic disk system, a read head and a write head formed on the head slider 90 approach a prescribed recording position on the disk 91 and move relatively with the mechanism, sequentially write signals, and read the signals. The actuator 92 is desirably a rotary actuator. Recording signals are recorded on the medium with the write head through a signal processing system 94 and the output of the read head is obtained as signals through the signal processing system 94. Further, when the read head is moved onto an intended recording track, it is possible to detect the position on the track with a highly sensitive output from the read head, control the actuator, and carry out the positioning of the head slider. Although each of the head slider 90 and the disk 91 is shown as a single unit in the figure, each of those may be disposed as plural units. Further, the disk 91 may have recording mediums 95 on both the sides and record information. When information is recorded on both the sides of a disk, the head slider 90 is disposed on each side of the disk.

With regard to such configurations as stated above, as a result of tests of magnetic heads according to embodiments of the present invention and magnetic storage apparatuses on which the magnetic heads were mounted, spin torque noise could be suppressed and the yield of the heads improved.

The structure according to embodiments of the present invention can be used for: a magnetic sensor and a magnetic head using current perpendicular to plane giant magnetoresistance effect called CPP-GMR; and a magnetic sensor and a magnetic head using tunneling magnetoresistance effect.

What is claimed is:

1. A current perpendicular to plane magnetoresistive head characterized in that: the head has a structure formed by an antiferromagnetic layer, and by laminating a first pinned layer, an antiparallel coupling layer, a second pinned layer, a nonmagnetic intermediate layer, and a free layer in sequence, and wherein no additional pinned layer is formed beyond the free layer in sequence; sensing current flows from the free layer toward the first pinned layer; and the relative angle of magnetization between the second pinned layer and the free layer is in the range of 70 to 80 degrees in the state where a magnetic field to be sensed is not applied, and wherein spin torque noise is suppressed based on the relative angle and the direction of the sensing current.

2. The current perpendicular to plane magnetoresistive head according to claim 1, characterized in that, when the product of the thickness and the saturation magnetization of the first pinned layer is defined as M1 and the product of the thickness and the saturation magnetization of the second pinned layer is defined as M2, M1 is larger than M2.

3. The current perpendicular to plane magnetoresistive head according to claim 1, characterized in that the magnetization of the second pinned layer leans by 10 to 20 degrees from the direction of sensor height.

4. A current perpendicular to plane magnetoresistive head characterized in that: the head has a structure formed by an antiferromagnetic layer, and by laminating a first pinned layer, an antiparallel coupling layer, a second pinned layer, a nonmagnetic intermediate layer, and a free layer in sequence, and wherein no additional pinned layer is formed beyond the free layer in sequence; sensing current flows from the first pinned layer toward the free layer; and the relative angle of magnetization between the second pinned layer and the free layer is in the range of 100 to 110 degrees in the state where a magnetic field to be sensed is not applied, and wherein spin torque noise is suppressed based on the relative angle and the direction of the sensing current.

5. The current perpendicular to plane magnetoresistive head according to claim 4, characterized in that, when the product of the thickness and the saturation magnetization of the first pinned layer is defined as M1 and the product of the thickness and the saturation magnetization of the second pinned layer is defined as M2, M2 is larger than M1.

6. The current perpendicular to plane magnetoresistive head according to claim 4, characterized in that the magnetization of the second pinned layer leans by 10 to 20 degrees from the direction of sensor height.

7. A magnetoresistive head having a current perpendicular to plane magnetoresistive element formed by an antiferromagnetic layer, and by laminating a first pinned layer, an antiparallel coupling layer, a second pinned layer, a nonmagnetic intermediate layer, and a free layer in sequence, and wherein no additional pinned layer is formed beyond the free layer in sequence, wherein sensing current is configured to flow between a first electrode disposed on the side of the free layer and a second electrode disposed on the side of the first pinned layer, the head being characterized in that: the sensing current is configured to flow in one of the following directions: (a) from the free layer toward the first pinned layer such that the asymmetry of a signal waveform is in the range of less than 0% to −10% or greater than 0% to +20%; or (b) from the first pinned layer toward the free layer such that the asymmetry of the signal waveform is in the range of −20% to −10%; and wherein spin torque noise is suppressed based on the signal waveform asymmetry.

8. A magnetoresistive head having a current perpendicular to plane magnetoresistive element formed by an antiferromagnetic layer, and by laminating a first pinned layer, an antiparallel coupling layer, a second pinned layer, a nonmagnetic intermediate layer, and a free layer in sequence, and wherein no additional pinned layer is formed beyond the free layer in sequence, wherein sensing current is configured to flow between a first electrode disposed on the side of the free layer and a second electrode disposed on the side of the first pinned layer, the head being characterized in that: the sensing current is configured to flow in one of the following directions: (a) from the first pinned layer toward the free layer such that the asymmetry of a signal waveform is in the range of less than 0% to −20% or greater than 0% to +10%; or (b) from the free layer toward the first pinned layer such that the asymmetry of the signal waveform is in the range of +10% to +20%; and wherein spin torque noise is suppressed based on the signal waveform asymmetry.

\* \* \* \* \*